United States Patent
Bernard et al.

(10) Patent No.: US 6,378,252 B1
(45) Date of Patent: Apr. 30, 2002

(54) STUD FOR RETAINING INSULATING PANELS AND METHOD FOR INSTALLING INSULATING PANELS ALONG A WALL PROVIDED WITH SUCH STUDS

(75) Inventors: Pierre Bernard, Pierrefonds; Carl Trottier, St-Thomas-d' Aquin; Marc Julien, Montreal, all of (CA)

(73) Assignee: Solutions Jupiter Inc., Dorval (CA)

( * ) Notice: Subject to any disclaimer, the term of this patent is extended or adjusted under 35 U.S.C. 154(b) by 0 days.

(21) Appl. No.: 09/664,791

(22) Filed: Sep. 19, 2000

(51) Int. Cl.[7] .................................................. E04B 1/74
(52) U.S. Cl. ..................... 52/144; 52/475.1; 52/474; 52/762; 52/781.3; 52/738.1; 52/783.15; 296/181
(58) Field of Search ............ 52/144, 474, 475.1, 52/762, 769, 772, 781.3, 783.19, 784.15, 798.1; 296/181, 39.3

(56) References Cited

U.S. PATENT DOCUMENTS

| | | | | |
|---|---|---|---|---|
| 2,063,010 A | * | 12/1936 | Balduf | 52/772 |
| 2,104,989 A | * | 1/1938 | Hicks | 52/474 |
| 2,268,517 A | * | 12/1941 | Small | 52/798.1 |
| 2,384,965 A | * | 9/1945 | Reid | 296/181 |
| 2,956,653 A | * | 10/1960 | Liskey, Jr. | 52/474 |
| 2,962,323 A | * | 11/1960 | McBride | 296/181 |
| 3,126,224 A | * | 3/1964 | Carter et al. | 296/181 |
| 3,393,920 A | * | 7/1968 | Ehrlich | 52/783.19 |
| 3,432,979 A | * | 3/1969 | Heimann | 296/181 |
| 3,543,463 A | * | 12/1970 | Cannon | 52/783.19 |
| 4,114,595 A | * | 9/1978 | Barker | 126/270 |
| 4,882,883 A | * | 11/1989 | Horn | 52/79.1 |

OTHER PUBLICATIONS

Onan Cummins—Generator set Catalogue—Powerful Solutions—Minneapolis, MN 55432 (1998).

* cited by examiner

*Primary Examiner*—Carl D. Friedman
*Assistant Examiner*—Phi Dieu Tran A
(74) *Attorney, Agent, or Firm*—Francois Martineau

(57) ABSTRACT

The power generator unit includes a container having an acoustically insulated inner wall. The inner wall has wall panels each provided with a number of spaced-apart vertical retention studs between which acoustic panels are installed. The retention studs have a cross-sectionally C-shaped main body from which laterally and outwardly extend wing flanges. The acoustic panels are retained against the wall panel by the wing flanges which overlap the side edge portions of the acoustic panels.

1 Claim, 3 Drawing Sheets

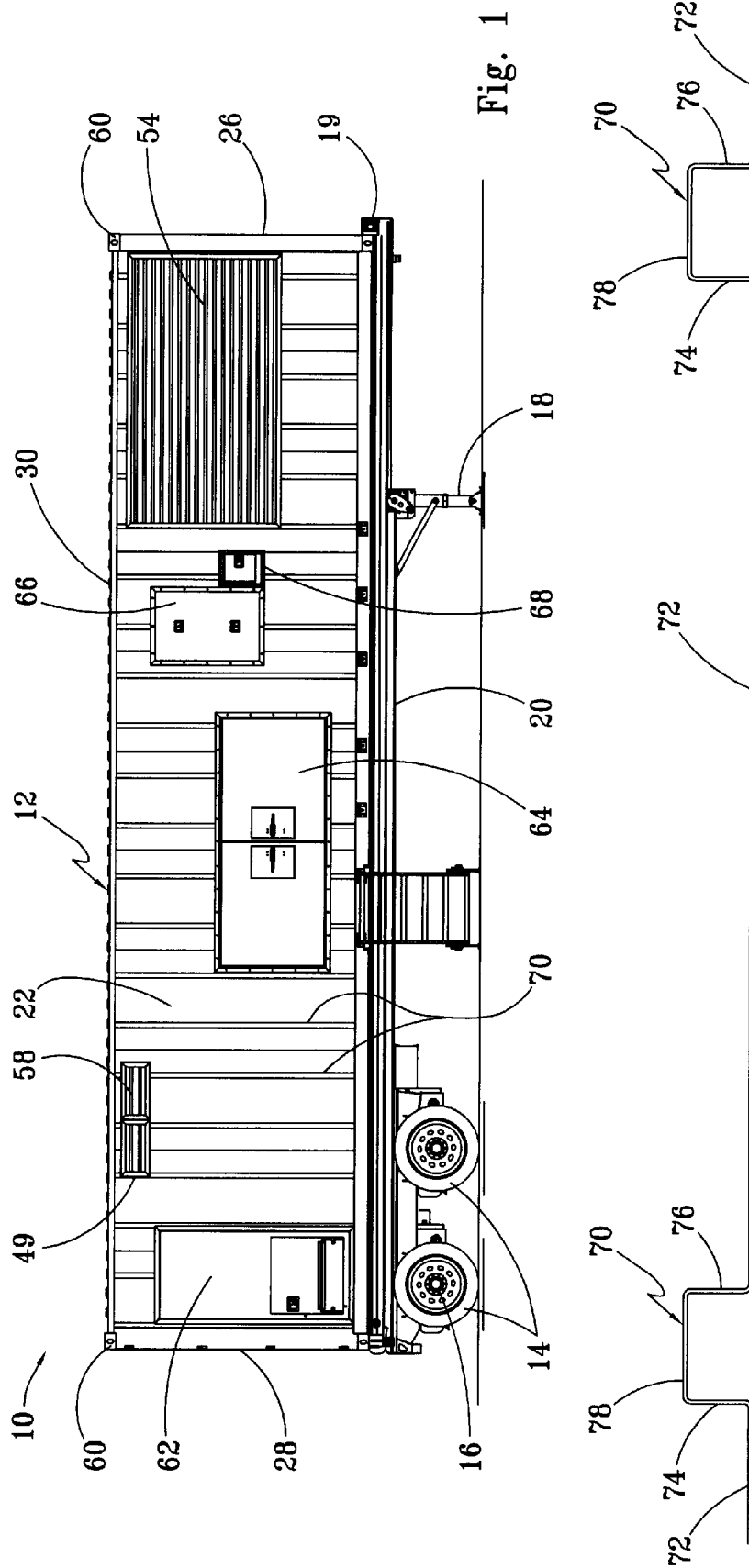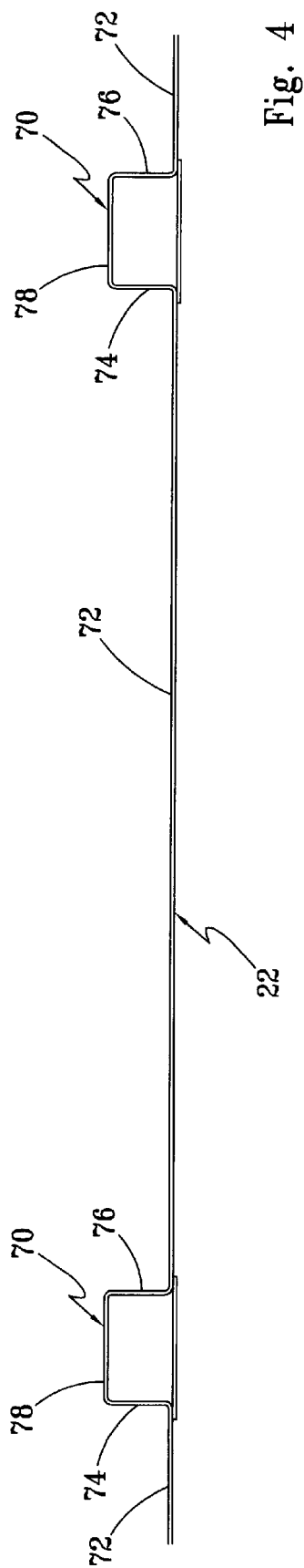

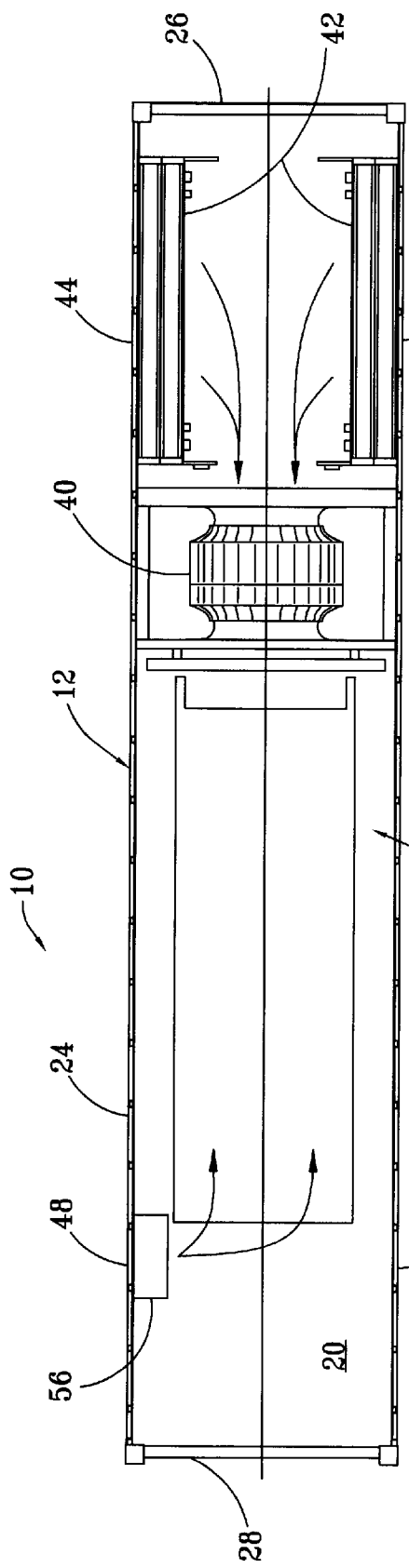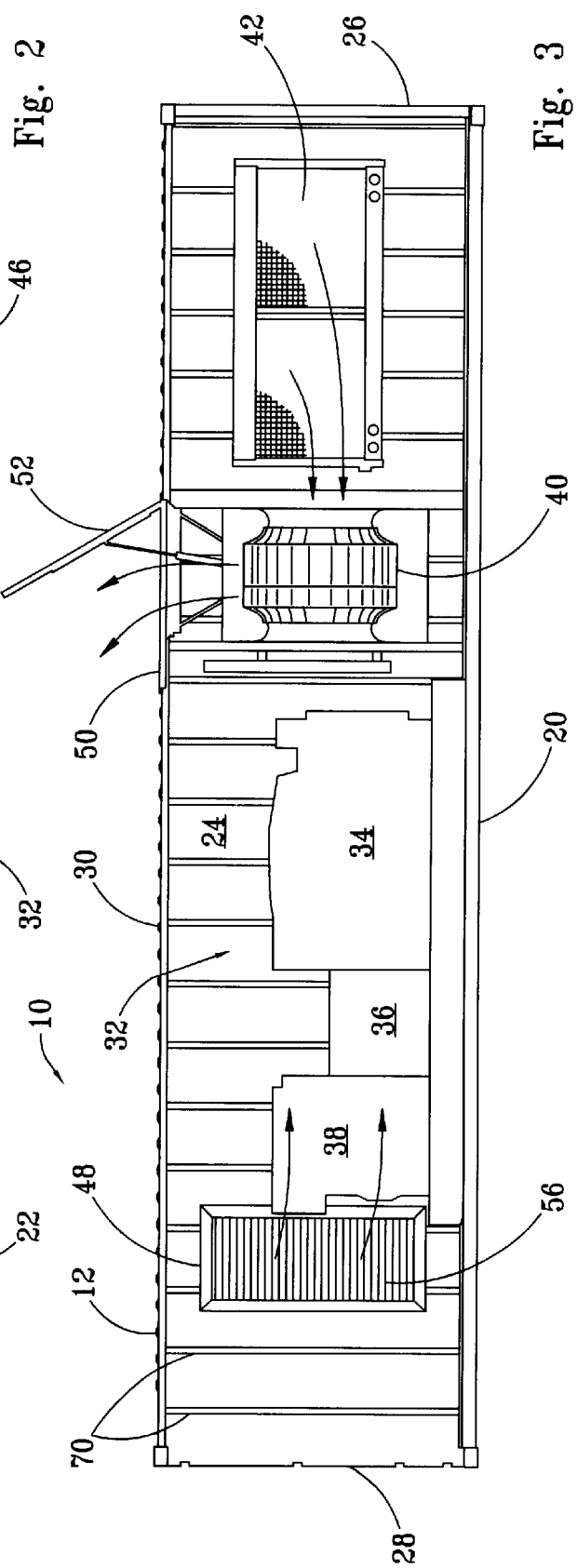

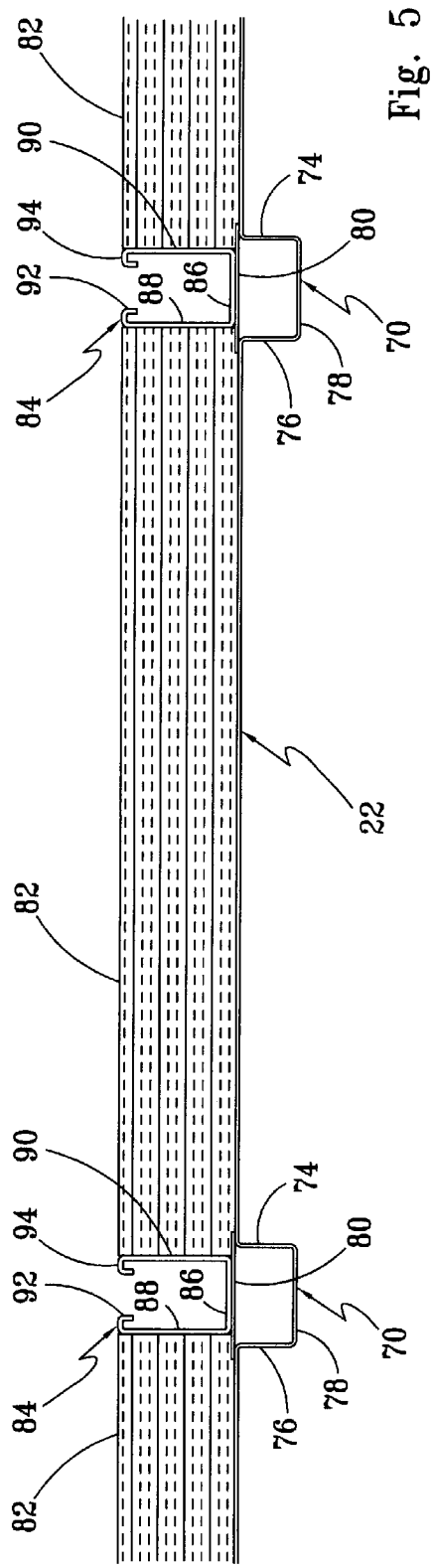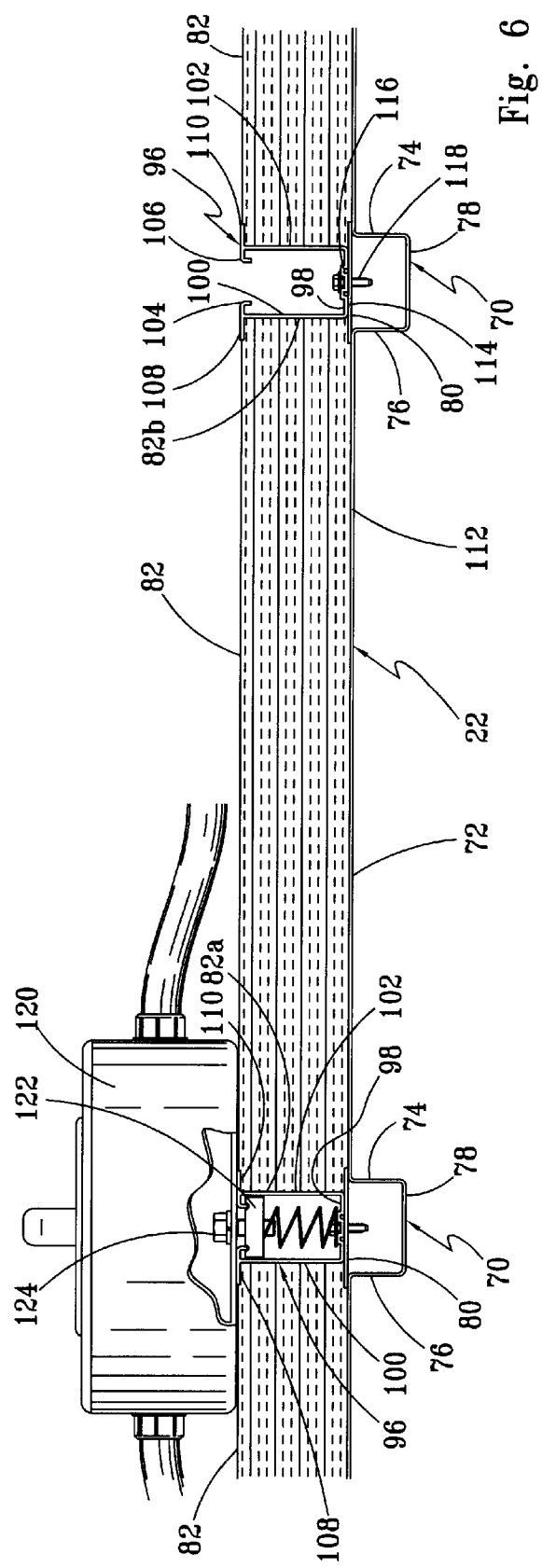

STUD FOR RETAINING INSULATING PANELS AND METHOD FOR INSTALLING INSULATING PANELS ALONG A WALL PROVIDED WITH SUCH STUDS

FIELD OF THE INVENTION

The present invention relates to wall insulation, and more particularly to a stud for retaining insulating panels, especially adapted for acoustic insulating panels provided in mobile power generator units.

BACKGROUND OF THE INVENTION

High output mobile power generator units are used to provide electricity to electric grids which suffer from temporary power failure, which do not have access to the usual power lines, or as a fall-back option for electric grids to compensate temporary power insufficiencies.

A conventional mobile power generator unit includes a mobile container, usually in the form of a semi-trailer container which can be hitched to a tow truck for carrying the mobile generator unit. The mobile container carries in its inner chamber a power generating motor assembly including a motor, a flywheel, a drive, a radiator, a fuel tank, cooling fans, and other elements known in the art. Openings are present in the walls of the container, for example for providing fresh air intake ports for cooling the radiator and for feeding air to the motor combustion chamber, and for providing warm air outlet ports. Most, if not all, of the air intake and air outlet openings are covered with acoustic louvers, which allow the required air circulation, while preventing an important portion of the sound emitted by the power generating motor assembly from exiting the container. The power generating motor assembly being a very loud device, it is desirable to control the sound emissions coming out of the container, especially when the power generator unit is installed in a residential area.

To help reduce the sound levels outside of the container, it is known to install on the inner walls of the container some acoustically insulating panels. The louvers are also acoustically insulated, and thus sound emissions can be significantly reduced.

However, the acoustically insulated panels for the container walls have the disadvantage of being fragile, and difficult to install. One example of an acoustically insulated panel which is used to insulate power generator unit container walls is a semi-rigid panel comprising a first and a second foam layer separated by a plastic sheet. The first foam layer is provided with a glue film on its outer surface opposite the plastic sheet, and a removable protective paper sheet is applied on the glue film to prevent the foam layer from sticking to other objects before it is installed. The second foam layer is provided with a perforated fabric layer on its outer surface opposite the plastic sheet, which acts as a protective layer for the underlying foam material. The plastic sheet is preferably made of vinyl, while the foam layer is preferably made of resin melamine foam sold under the registered trademark Basotect by the company BASF PLASTICS.

To install such an acoustically insulated panel against a wall of the power generator unit container, the protective paper sheet is removed, and the panel is flatly abutted and pressed against the container wall. The glue sets, and the insulated panel then theoretically remains attached to the container wall.

A problem with the attachment of the panel to the wall, is that it is difficult to keep the panel in a vertical position against the wall before the glue sets. Indeed, applying pressure on large insulated panels can be a complicated task. Moreover, the Basotect foam panels are fragile, and thus concentrated pressure points can damage the panel. Also, even if glue is used, the insulated panel may be prone to accidentally being removed from the container wall when the power generating motor assembly is moved inside the container, e.g. when the motor is changed. Indeed, the insulating panels are usually installed between spaced-apart channel vertical studs provided along the container wall, and although every effort is made to ensure that the insulating acoustic panel will be flatly attached to the wall, it is likely that the side edge portions of some panels will protrude slightly beyond the studs. When the machinery located inside the container is moved about, it may accidentally catch the protruding side edge portions of the insulating acoustic panels, thus possibly damaging them or removing them from the container walls.

OBJECTS OF THE INVENTION

It is therefore an object of the present invention to provide a stud for retaining insulating panels against a structural wall.

It is another object of the present invention to provide a method for installing insulating panels along a wall provided with studs according to the present invention.

SUMMARY OF THE INVENTION

The present invention relates to a rigid elongated retention stud for use in retaining insulating panels against a structural wall, said retention stud comprising a cross-sectionally C-shaped main body defining a back wall to be fixedly attached to the structural wall, a pair of spaced-apart, parallel side walls integrally extending from said back wall and having a free front edge portion opposite said back wall, and a pair of wing flange members each integrally attached to a corresponding said free front edge portion and extending laterally outwardly away from said main body perpendicularly to said side walls.

The invention also relates to an acoustically insulated wall structure for use in a mobile generator unit, comprising:

a wall panel having an inner surface and an outer surface;

a number of spaced-apart, rigid, elongated retention studs each comprising a cross-sectionally C-shaped main body defining a back wall fixedly attached to said wall panel inner surface, a pair of spaced-apart, parallel side walls integrally extending from said back wall and having a free front edge portion opposite said back wall, and a pair of wing flange members each integrally attached to a corresponding said free front edge portion and extending laterally and outwardly away from said main body perpendicularly to said side walls; and a number of acoustic panels defining a front surface, a rear surface, and first and second opposite side edge portions, each said acoustic panel having its rear surface applied against said wall panel and being located between two successive said retention studs, with said wing flange members extending over said acoustic panel front surface at said side edge portions thereof.

Preferably, said wall panel further comprises a number of vertically extending, spaced-apart ribs defining concave surfaces on said wall panel inner surface and convex surfaces on said wall panel outer surface, and a number of elongated, rigid reinforcement strips fixedly attached to said wall panel in facing register with each said rib concave surface, each said rib being thus covered with a corresponding reinforcement strip.

Preferably, each said retention stud is fixedly attached to a corresponding reinforcement strip.

Preferably, a glue compound is applied between said acoustic panels and said wall panel to further attach said acoustic panels to said wall panel.

Preferably, said acoustic wall panel is semi-rigid.

Preferably, said free front edge portion of each said stud side wall further comprises an intumed flange opposite said wing flange member.

Preferably, said back wall is provided with a pair of longitudinal ribs for guiding screws being driven through said back wall when fixing said retention stud to said wall panel.

The invention also relates to a method for installing a semi-rigid acoustic panel to a wall panel between a first and a second rigid retention stud, the acoustical panel having a front surface, a rear surface, and first and second opposite side edge portions, with a glue compound being provided on the acoustic panel rear surface and with a removable protective sheet being provided over the glue-covered rear surface of the acoustically insulating panel, the wall panel having an inner surface and an outer surface, and the retention studs each having a cross-sectionally C-shaped main body defining a back wall, a pair of spaced-apart, parallel side walls integrally extending from said back wall and having a free front edge portion opposite said back wall, and a pair of wing flange members each integrally attached to a corresponding said free front edge portion and extending laterally and outwardly away from said main body perpendicularly to said side walls, said method comprising the following steps:

a) fixedly attaching the first and the second retention studs to the wall panel so that their main bodies be spaced apart of a distance corresponding to the width of the acoustic panel;

b) inserting the first side edge of the acoustic panel between the wall panel and the wing flange member of the first stud which is in facing register with the second stud, the acoustic panel then obliquely extending away from the wall panel;

c) removing the protective sheet from the glue-covered rear surface of the acoustic panel;

d) pivoting the acoustic panel towards the wall panel while slightly bending the acoustic panel until its second side edge clears the wing flange member of the second stud which is in facing register with the wing flange member of the first stud;

e) releasing the acoustic panel from its bending position while simultaneously sliding the second side edge of the acoustic panel between the wing flange member of the second stud and the wall panel, the acoustic panel then being flatly pressed against the wall panel; and f) allowing the glue compound, then applied against the wall panel, to set.

DESCRIPTION OF THE DRAWINGS

In the annexed drawings:

FIG. 1 is a side elevation of a power generator unit, and more particularly of the semi-trailer container thereof;

FIG. 2 is a top plan view of power generator unit of FIG. 1, with the ceiling panel being removed for illustrating the interior of the container;

FIG. 3 is a side elevation of the power generator unit of FIG. 1, with one side wall panel being removed for illustrating the interior of the container, and with the top warm air outlet trap door being in an opened condition;

FIG. 4 is a cross-sectional view of the reinforced wall structure of the container;

FIG. 5 is a cross-sectional view of the reinforced wall structure of the container, provided with insulating panels and prior art channel studs; and FIG. 6 is a cross-sectional view of the reinforced wall structure of the container, provided with insulating panels and retention studs according to the present invention.

DETAILED DESCRIPTION OF THE EMBODIMENTS

FIGS. 1, 2 and 3 show a power generator unit 10 comprising a movable semitrailer container 12 carried over ground by a number of wheels 14 mounted by pairs to axles 16. A pivotable front foot member 18 allows container 12 to be maintained in a horizontal condition when it is in operation, while a front hitch 19 allows releasable attachment of container 12 to a tow truck for carrying container 12 when it is inoperative. Container 12 defines a reinforced floor 20; a peripheral wall comprising first and second side walls 22, 24, a front wall 26 and a rear wall 28 in the form of a pair of access doors; and a ceiling 30.

A power generating motor assembly generally referred to by numeral 32 is carried inside the inner chamber enclosed inside the container 12, the power generating motor assembly comprising the conventional elements, among them a motor 34, a drive 36, a flywheel 38, a cooling air fan assembly 40, and a radiator assembly 42. Fresh air intake ports 44, 46, 48, 49 are provided in the container side walls 22, 24, and a warm air outlet port 50 is provided on the container ceiling 30, with a trap door 52 selectively closing outlet port 50. Acoustic louvers 54, 56, 58 are provided on fresh air intake ports 46, 48, 49 respectively. An additional acoustic louver (concealed in the drawings) is also provided on fresh air intake port 44.

Corner castings 60 engageable by hooks from a crane are provided on the upper corners of container 12, for example for use when loading the container 12 on a boat.

FIG. 1 further shows that the first side wall panel 22 of container 12 comprises other openings, which are used to fit the following known elements: a breaker panel 62, a motor service access door 64, a hydraulic cylinder service access door 66, and a fuel tank refilling inlet access door 68. Other openings (not shown) provided on either side wall 22 or side wall 24, can be provided, for fitting other known elements such as a window for visual inspection of the level of cooling fluids, an emergency stop control button, a cooling fresh air intake port for the alternator covered with acoustic louvers, a radiator pipe service access door, and a radiator sensor access trap.

It can consequently be understood that a number of openings are made in container 12, and more specifically in the container peripheral wall 22, 24, 26, 28. These openings are compulsory for a proper use of power generator unit 10, but structurally weaken container 12 considerably.

As shown in FIG. 4, each one of the side wall panels 22, 24 of container 12, for example side wall panel 22, is made from a corrugated sheet of metal which is bent so as to define vertical ribs 70 therein. Side wall panel 22 thus defines flat wall panel portions 72 which are interrupted by ribs 70, with ribs 70 comprising a pair of parallel, spaced-apart flanking wall portions 74, 76 outwardly and integrally extending from two successive flat wall panel portions 72, 72, and an end wall portion 78 transversal to and integrally linking the flanking wall portions 74, 76 at outer end portions thereof. More particularly, end wall portion 78 is parallel to flat wall portions 72, 72, and flanking wall portions 74, 76 are perpendicular to end wall portion 78 and to flat wall portions 72, 72. Each rib 70 defines an inwardly oriented concave surface and an outwardly oriented convex surface, i.e. its concave surface is oriented towards the container inner chamber.

There is provided an elongated reinforcement strip 80 in facing register with each rib concave surface, the reinforcement strips 80 being vertically fixedly attached to the flat wall panel portions 72, 72 on each side of their corresponding ribs 70 and extending for the full length thereof. Each strip is made from a flat sheet of a same metallic material as that of wall 22. Each strip 80 is welded to flat wall panel portions 72, 72 with welding seams (not shown). Preferably, the welding seams have a length of one inch (2,5 centimeters), with a two inch (5 centimeter) gap between two successive welding seams.

Reinforcement strips 80 help to significantly increase the structural rigidity of side side walls 22, 24, due to the closed cross-sectional configuration that they form with their corresponding ribs 70.

Acoustically insulating panels 82 are provided on the interior surface of the peripheral wall of container 12, for example as shown in FIG. 6 on side wall panel 22. Panels 22 are preferably of the type described in the background of the invention. These acoustic panels include first and second spaced-apart Basotect® foam layers separated by a vinyl plastic sheet. The first foam layer is provided with a glue film on its outer surface opposite the plastic sheet, and a removable protective paper sheet is applied on the glue film to prevent the foam layer from sticking to other objects before it is installed. The second foam layer is provided with a perforated fabric layer on its outer surface opposite the plastic sheet, which acts as a protective sheet for the underlying foam material. The paper sheet is removed when installing panels 82 on the container peripheral wall.

FIG. 5 shows prior art studs 84 that are used to space two successive acoustic panels 82, 82 of known construction. These prior art channel studs 84 each define a horseshoe shape, with a rear wall 86 flatly engaging and fixedly attached (e.g. screwed) to the interior surface of reinforcement strips 80, two spaced-apart parallel side walls 88, 90 having intumed flanges 92, 94 on their inner free edges. It is known to use channel studs 84 to install thereon different elements necessary to the operation of power generating motor assembly, such as control panels, electrical relays, wire support hooks, etc. . . .

According to the present invention, and as shown in FIG. 6, there is provided retention studs 96 in replacement of the known, prior art studs 84. Retention studs 96 have a rear wall 98 flatly engaging reinforcement strip 80, two spaced-apart parallel side walls 100, 102 having intumed flanges 104, 106 at their inner free end portions, and sidewardly outwardly oriented wing flanges 108, 110 opposite flanges 104, 106 respectively, relative to side walls 100, 102. Retention studs 84 are preferably made from extruded aluminium, and are of a uniform cross-section all along their length, with studs 84 extending for the full height of wall 22. Notwithstanding the useful although non-compulsory intumed flanges 104, 106, studs 84 thus define a cross-sectionally C-shaped main body 98, 100, 102, from which laterally outwardly project wing flanges 108, 110.

Each acoustic panel 82 may thus be installed between two successive studs 96, 96, with the side wing flanges 108, 110 of the two studs 96, 96 that are in facing register with each other, retaining the vertical side edge portions 82b, 82a respectively of acoustic panel 82 all along its length. Panel 82 is conventionally provided with a glue compound on its back surface 112, to allow it to be securely attached to wall 22, and more particularly to the inner surface of flat wall portion 72. The wing flanges 108, 110 not only help the panel 82 to be retained, it further helps the initial installation of panel 82 since the latter will remain firmly applied against wall 22 until the glue sets. Also, with the prior art channel studs such as the one shown in FIG. 5, it was possible for an acoustic panel 82 to protrude beyond the flanges 92, 94 of the prior studs 84, thus being prone to be accidentally damaged or forcefully removed from its engagement against wall 22 when heavy machinery is moved within container 12. On the other hand, with the studs 96 of the present invention, the side edge portions 82a, 82b of panels 82 remain concealed behind the wing flanges 108, 110 of studs 96, preventing accidental damage thereto and preventing the machinery from catching the acoustic panel side edge portions 82a, 82b.

The rear wall 98 of stud 96 is provided with a pair of longitudinal ribs 114, 116 which allow the screws 118 used to fixedly attached stud 96 to wall 22, to be properly aligned during installation.

FIG. 6 further shows that an electric relay box 120 (or any other desired small element necessary to the operation of the power generating motor assembly 32) may be attached to retention channel stud 96. Known means of attachment of relay box 120 to stud 96 include a rotatable spring loaded attachment block 122, to which box 120 may be attached with a bolt 124.

According to the present invention, the method for installing each acoustically insulating panel comprises the following steps:

a) fixedly attaching, with screws 118, a first and a second spaced-apart channel retention stud 96 to the container side wall 22, and more particularly to reinforcement strips 80;

b) inserting a first side edge 82a of acoustic panel 82 between one side wing flange 110 of the first stud 96 and wall 22, panel 96 then obliquely extending away from wall 22;

c) removing the protective paper sheet from the rear glue-covered surface of acoustic panel 82;

d) pivoting panel 82 towards the container side wall 22 while slightly bending acoustic panel 82 until its second side edge 82b opposite first side edge 82a, clears the wing flange 108 of the second stud 96, the latter side wing flange 108 being in facing register with the other side wing flange 110 of the first stud 96;

e) releasing acoustic panel 82 from its bending position while simultaneously sliding the second side edge 82b of acoustic panel 82 between the side wing flange 108 of the second stud 96 and wall 22, the acoustic panel then being flatly pressed against the container side wall; and f) allowing the glue to set.

It is envisioned to provide an acoustic panel without any glue compound on its rear surface, that would be retained against the container wall solely by the stud wing flanges.

We claim:

1. A mobile generator unit comprising an acoustically insulated wall structure comprising:

a peripheral wall including at least one vertical wall panel having an inner surface and an outer surface, said wall panel comprising a number of vertically extending, spaced-apart ribs defining concave surfaces on said wall panel inner surface and convex surfaces on said wall panel outer surface, and a number of vertical, elongated, rigid reinforcement strips fixedly attached to said wall panel in facing register with each said rib concave surface, each said rib thus being covered with a corresponding reinforcement strip;

a number of spaced-apart, rigid, elongated retention studs vertically attached to said wall panel, each said retention stud being fixedly attached to a corresponding reinforcement strip, and each said stud comprising a cross-sectionally C-shaped main body defining a back wall fixedly attached to said wall panel inner surface, a pair of spaced-apart, parallel side walls integrally extending from said back wall and having a free front edge portion opposite said back wall, and a pair of wing flange members each integrally attached to a corresponding said free front edge portion and extending laterally and outwardly away from said main body perpendicularly to said side walls, said free front edge portion of each said stud side wall further comprising an inturned flange opposite said wing flange member; and a number of semi-rigid acoustic panels defining a front surface opposite said wall panel inner surface, a rear surface applied against said wall panel inner surface, and first and second opposite side edge portions, each said acoustic panel being located between two successive said retention studs, with said wing flange members extending over said acoustic panel front surface at said side edge portions thereof;

wherein said stud back wall is provided with a pair of longitudinal ribs for guiding screws being driven through said back wall when fixing said retention stud to a corresponding said strip.

* * * * *